United States Patent
Friedrich

[15] 3,646,251
[45] Feb. 29, 1972

[54] ELECTRICAL BUSHING HAVING STRESS-GRADING LAYER DISPOSED WITHIN SOLID INSULATION INCLUDING A GROUND LAYER TERMINATED AT EACH END WITH A LAYER OF MATERIAL HAVING A VOLTAGE-DEPENDENT RESISTIVITY

[72] Inventor: Kevin F. Friedrich, Sharon, Pa.
[73] Assignee: Westinghouse Electric Corporation, Pittsburgh, Pa.
[22] Filed: Dec. 8, 1970
[21] Appl. No.: 96,151

[52] U.S. Cl. .................................................174/142, 174/73 R
[51] Int. Cl. .............................................................H01b 17/26
[58] Field of Search....................174/73 R, 73 SC, 127, 142, 174/143

[56] References Cited

UNITED STATES PATENTS

| | | |
|---|---|---|
| 3,001,005 | 9/1961 | Sonnenberg..........................174/142 |
| 3,146,518 | 9/1964 | Kishida..............................174/143 X |
| 3,210,460 | 10/1965 | Suelmann............................174/73 R |
| 3,349,164 | 10/1967 | Wyatt.................................174/73 R |
| 3,396,231 | 8/1968 | Anderson............................174/73 R |

FOREIGN PATENTS OR APPLICATIONS

| | | |
|---|---|---|
| 1,160,938 | 1/1964 | Germany............................174/73 SC |

*Primary Examiner*—Laramie E. Askin
*Attorney*—A. T. Stratton, F. E. Browder and Donald R. Lackey

[57] ABSTRACT

A high-voltage electrical bushing having solid electrical insulation disposed about an electrical conductor, with an axial and radial stress-grading structure disposed within the solid insulation. The stress-grading structure includes a ground layer in the form of a substantially cylindrical band of electrically conductive material disposed coaxially with the electrical conductor, with both ends of the electrically conductive band being connected to stress-grading materials having a voltage-dependent resistivity.

11 Claims, 7 Drawing Figures

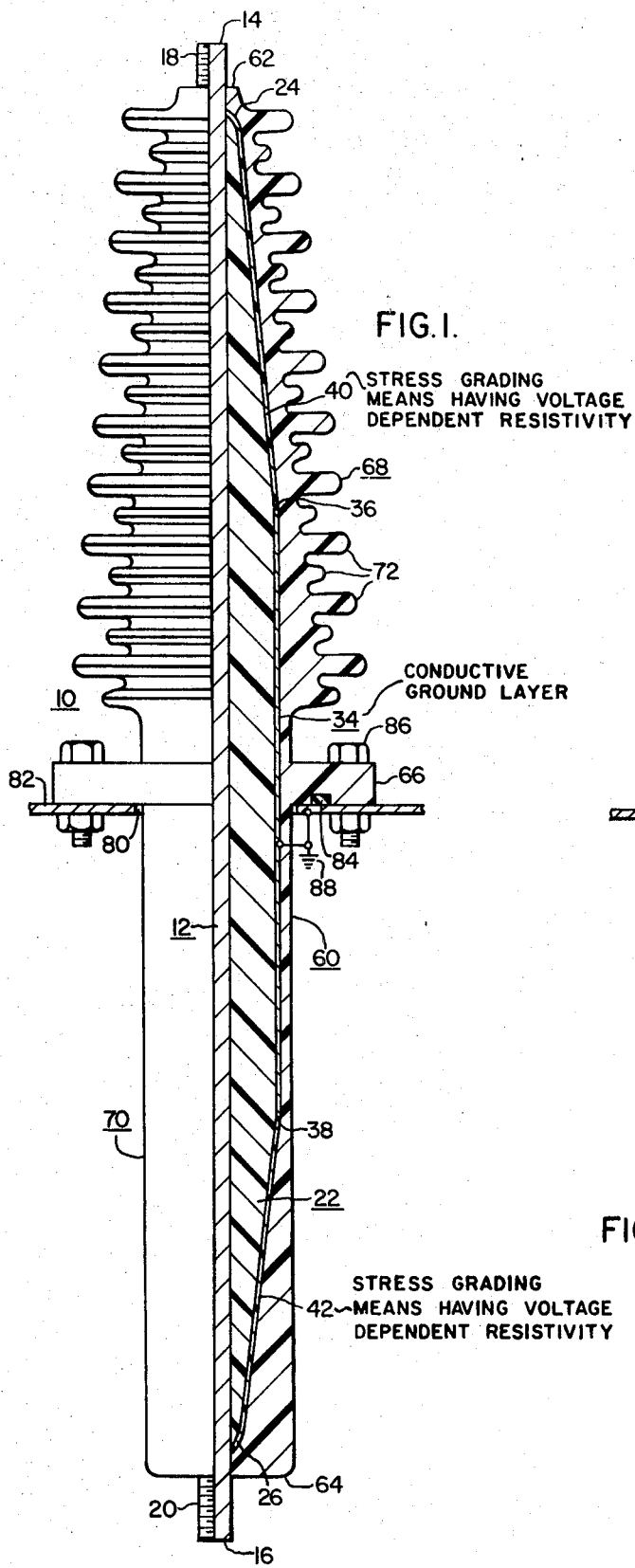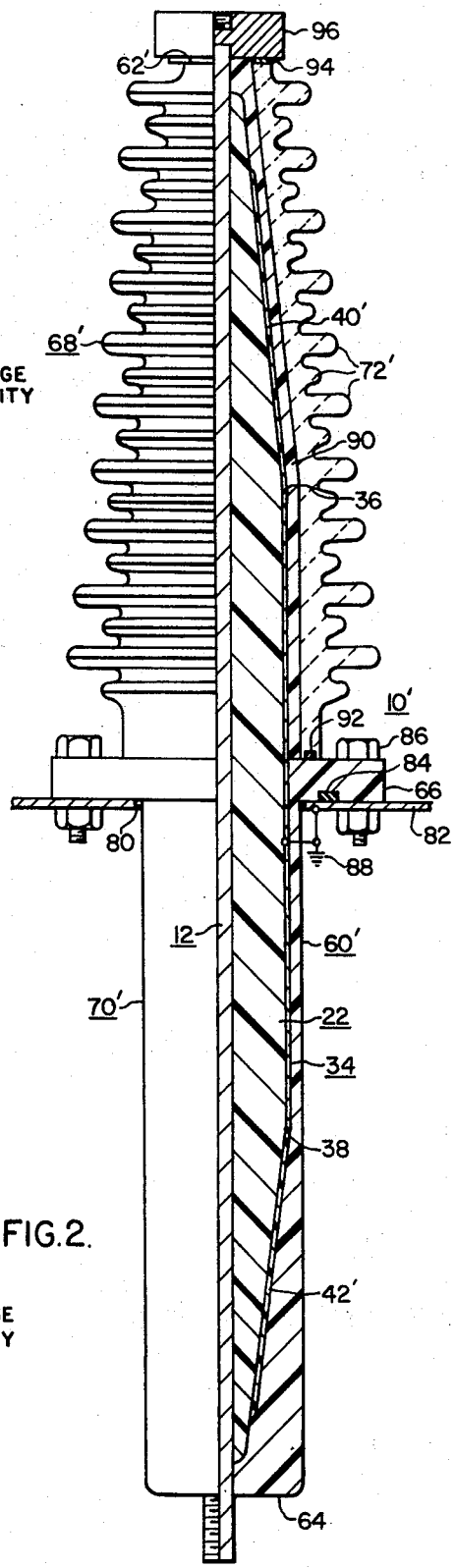

Patented Feb. 29, 1972

ELECTRICAL BUSHING HAVING STRESS-GRADING LAYER DISPOSED WITHIN SOLID INSULATION INCLUDING A GROUND LAYER TERMINATED AT EACH END WITH A LAYER OF MATERIAL HAVING A VOLTAGE-DEPENDENT RESISTIVITY

BACKGROUND OF THE INVENTION

1. Field of the Invention

The invention relates in general to electrical bushings, and more specifically to high-voltage electrical bushings suitable for use with power transformers and circuit breakers.

2. Description of the Prior Art

Condenser type bushings have been successfully employed for many years for bringing a high-voltage conductor through the grounded metallic casing of electrical apparatus, such as for power transformers and power circuit breakers. Conventionally, the capacitor section of the bushing is constructed by winding a high-quality paper on the bushing conductor, while feeding in sheets of metallic foil at predetermined intervals to form a plurality of concentric capacitor plates. The capacitor section is then mounted within two porcelain housings, which contain impregnating oil for the capacitor section to prevent the formation of corona discharges, and reduce the power factor of the capacitor section of the bushing.

The development of excellent high-strength, weather-resistant, castable, nontracking, solid resinous insulation systems, such as those of the epoxy type, has led to the use of cast resin systems for forming the capacitor section of certain types and ratings of electrical bushings, with a plurality of concentric foils or plates of the capacitor section being radially spaced through the cast solid resinous insulation system. While this structure reduces the cost of the capacitor section, and makes it possible to eliminate the fragile porcelain shells or housings, as well as the impregnating oil, difficulty has been experienced in holding the relatively thin capacitor plates within the casting mold, and maintaining the desired position of the plates as the liquid but highly filled resinous insulation system is introduced into the mold and cured to a solid.

Thus, it would be desirable to provide the function of the plurality of capacitor plates, i.e., axial and radial stress grading, without the necessity of coaxially stacking and holding a large plurality of capacitor plates within a mold, and maintaining their relative positions as the resin system is introduced into the mold and cured to a solid.

SUMMARY OF THE INVENTION

Briefly, the present invention is a new and improved high-voltage electrical bushing which utilizes cast solid insulation. However, instead of embedding a plurality of electrically conductive foils or plates within a cast solid insulation system, a substantially cylindrical body member, without foils, is cast about the electrical conductor of the bushing. Electrically conductive means, such as an electrically conductive coating, is disposed about the outer surface of the cast body member and spaced from the ends thereof, to provide a smooth, cylindrical ground layer, which is adapted for connection to ground during the normal operation of the bushing. Stress-grading means having a voltage-dependent resistivity is disposed on the cast body member, such that it contacts the ends of the ground layer and extends toward both ends of the body member. In certain embodiments of the invention, the stress-grading means extends to and contacts the electrical conductor of the bushing, while in other embodiments it is terminated before reaching the conductor, depending upon the resistivity of the stress-grading means. Solid insulation is disposed about the cast body member, which completely surrounds and seals the electrically conductive ground layer and the stress-grading means connected thereto.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 1 is an elevational view, partially in section, of an electrical bushing constructed according to a first embodiment of the invention;

FIG. 2 is an elevational view, partially in section, of an electrical bushing constructed according to another embodiment of the invention;

DESCRIPTION OF PREFERRED EMBODIMENTS

Figure 3:
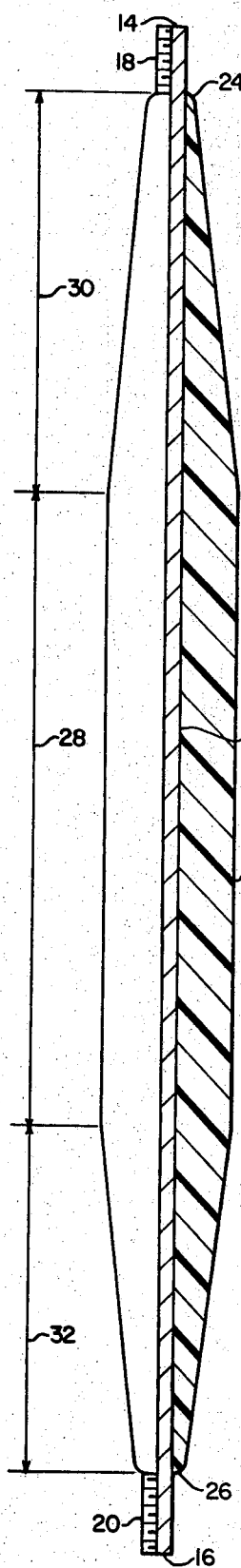
FIG. 3 is an elevational view, partially in section, which illustrates a first step in the manufacture of the electrical bushings shown in FIGS. 1 and 2.

Referring now to the drawings, and FIG. 1 in particular, there is shown an elevational view, partially in section, of a high-voltage electrical bushing 10 constructed according to a first embodiment of the invention. Bushing 10, which may be used with power transformers or power circuit breakers, has a generally elongated shape, and includes a centrally or axially extending electrical conductor 12 having first and second ends 14 and 16, respectively, formed of a good electrical conductor such as copper or aluminum. Conductor 12 may be threaded adjacent to its ends 14 and 16, as illustrated at 18 and 20, respectively, in order to provide means for connecting external and encased electrical leads thereto, respectively.

Electrical conductor 12 has a first insulating body member or portion 22 disposed thereon having first and second ends 24 and 26, respectively, which ends are spaced from the first and second ends 18 and 20, respectively, of the electrical conductor. The first or inner insulating body member 22, best shown in FIG. 3, which is an elevational view, partially in section of a first step in the manufacture of bushing 10, is formed of a cast solid resinous insulation system. The cast resinous insulation system is preferably thermosetting, but thermoplastic resin systems may be used if their softening temperatures are well above the maximum operating temperature of the electrical bushing. In general, the resin system of which the body portion 22 is formed should be mechanically strong, weather resistant, it should have a low shrinkage factor upon curing, it should provide good adhesion to the conductor 12, and have excellent crack resistance upon thermal cycling. The resinous polymeric epoxides have been found to be excellent.

The resin system selected may be filled with suitable finely divided, inorganic fillers, to obtain nontracking characteristics, to reduce shrinkage upon curing of the resin system, to more closely match the coefficient of thermal expansion of the resin system with the conductor 12, and to provide other desirable characteristics. Suitable fillers which may be used are alumina trihydrate ($Al_2O_3 \cdot 3H_2O$), quartz, and silica.

Figure 4:
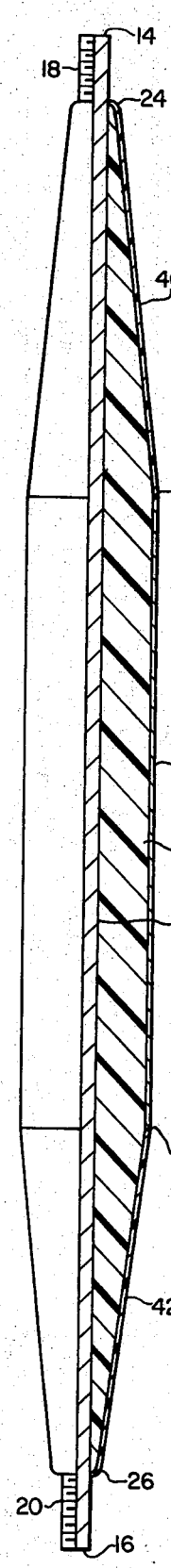
FIG. 4 is an elevational view, partially in section, of another step in the manufacture of the electrical bushings shown in FIGS. 1 and 2.

It should be noted that the insulating body member 22 is formed without the requirement of disposing a plurality of radially spaced, thin, metallic capacitor foils or plates in the casting mold, to disperse the plates throughout the solid insulation, even though the electrical bushing 10 is a high-voltage bushing, i.e., suitable for 69 to 115 kv., and higher. The desired axial and radial stress grading is provided by constructing the body member 22 such that it has a substantially cylindrical portion 28 intermediate its ends 24 and 26, and first and second tapered portions 30 and 32, respectively, which taper the body portion 22 inwardly from the ends of the cylindrical intermediate or middle portion 28 to the first and second ends 24 and 26 thereof, of the body member 22; or, the body member 22 may be formed such that it is substantially cylindrical across its complete length, depending upon the specific requirements for the electrical bushing. An electrically conductive member 34, having first and second ends 36 and 38, respectively, which forms the ground layer for the electrical bushing 10 is fixed to the outer surface of the body member 22, such as to the cylindrical intermediate portion 28 when the body member 22 has tapered ends. This step in the manufacture of electrical bushing 10 is best illustrated in FIG. 4, which is an elevational view, partially in section, illustrating the manufacturing step following the step shown in FIG. 3.

Electrically conductive member 34 may be a discrete, thin rectangular sheet formed of a good electrical conductor, such as aluminum, or, preferably, it may be formed of a conductive paint, such as aluminum paint, which may be sprayed or brushed onto the intermediate portion 28 of the body member 22.

Stress-grading means having a voltage dependent resistivity is then applied to the first and second portions 30 and 32, respectively, of body member 22, which portions may be tapered, as illustrated, or which may be untapered, as desired, with the stress-grading means usually contacting both the first and second ends 36 and 38 of the ground layer 34. The physical configuration or pattern of the stress-grading means, and the axial length or extension of the stress-grading means taken in the direction from the ends of the ground layer towards the ends of the electrical conductor 12, will depend upon the specific characteristics of the stress-grading means selected, and the specific application the bushing is to be used for. For example, FIGS. 1 and 4 illustrate an embodiment of the invention in which the stress-grading means includes members 40 and 42 applied uniformly to the outer surfaces of the portions 30 and 32, respectively, of the body member 22, extending from the ends 36 and 38 of the ground layer 34 to ends 24 and 26 of the body member 22, electrically contacting both the ground layer 34 and the axially extending electrical conductor 12.

Figure 4C:
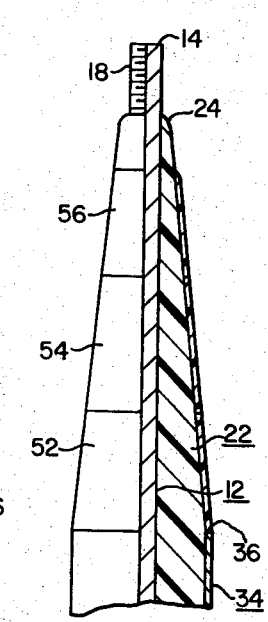
FIGS. 4A, 4B and 4C are fragmentary elevational views, partially in section, which illustrate alternate arrangements and configurations for the stress-grading means used in the electrical bushings shown in FIGS. 1 and 2.
Figure 4A:
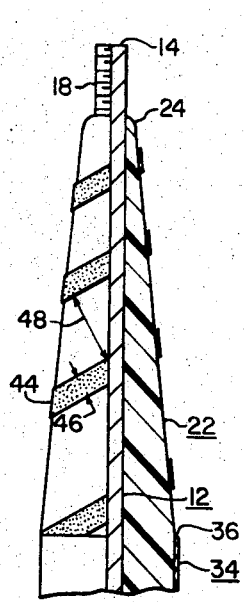
Figure 4B:
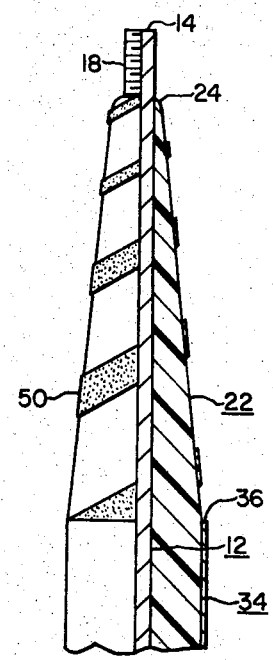

Alternate arrangements for the stress-grading means are shown in FIGS. 4A, 4B and 4C, which are fragmentary elevational views of the portion 30 of body member 22. FIG. 4A illustrates that the stress-grading means may be applied in an axially discontinuous pattern, such as a spiraled coating 44, with the coating 44 having a uniform width 46, and a predetermined spacing 48. The spiraled coating may extend from end 36 of the ground layer 34 to the conductor 12, as illustrated, or it may terminate before reaching the conductor 12, depending upon the characteristics of the stress-grading material selected.

FIG. 4B illustrates that the stress-grading means may be applied in the form of a spiraled coating 50 having a width dimension that changes, decreasing as the pattern progresses from the extreme ends of the ground layer 34 toward the ends 24 and 26 of the body member 22, as illustrated, or the width of the pattern may decrease as it progresses from the ends 24 and 26 of the body member 22 towards the ground layer 34, depending upon the voltage-dependent resistivity of the stress-grading means selected, and the bushing construction utilized.

FIG. 4C illustrates that the stress-grading means may be applied in the form of a plurality of serially connected coatings, such as coatings 52, 54 and 56, each having a predetermined different voltage-dependent resistivity. For example, the coating 52 connected to the end 36 of the ground layer 34 may have the highest resistivity at a predetermined voltage, with coatings 54 and 56 having progressively lower resistivities at the same voltage. However, in certain instances, depending upon the characteristics of the coatings and bushing construction, it may be desirable to have coating 52 have the lowest resistivity at a predetermined voltage. The serially connected coatings may terminate before reaching conductor 12, or they may extend to conductor 12, depending upon the characteristics of the coatings.

The stress-grading means should have the characteristic of a true semiconductor, whereby its conductivity is a function of the voltage across its length. The property of the stress-grading means whereby its conductivity is a function of the voltage across its length grades the electrical stress axially and radially, and terminates the ground layer 34 without severe distortion of the electrical field, thus preventing concentration of the electrical stress at the termination of the ground layer 34 and preventing corona discharges and the resultant radio interference and degradation of the surrounding insulation. The electrical potential of the stress-grading means increases along its length as it extends outwardly from the ground layer 34, to reduce the potential difference between the stress-grading coating and the electrical conductor 12. This electrical stress grading is accomplished by the gradual reduction of the voltage difference between the stress-grading means and the electrical conductor 12 with distance along the stress-grading coating measured from the ground layer 34, caused by the stress-grading means supplying capacitive current to the environment. This gradual reduction in potential difference along the stress-grading means is due to the fact that it is a true semiconductor, whose resistivity changes with the strength of the electrical field. In a region of high electrical field, the stress-grading means is essentially a conductor, and in a region of low field, it is essentially an insulator. Thus, the stress-grading means automatically assumes the proper resistivity to meet the electrical conditions to which it is subjected. The stress-grading means thus has one portion conducting in the region of maximum field near the ends of the ground layer 34, and another portion substantially nonconducting in the region of low field, with a gradual transition between these two conditions. This gradual transition results in a more nearly uniform field and prevents the formation of corona discharges.

Any stress-grading means having the proper resistivity range and conductivity which varies with voltage across its length may be utilized as the electrical stress-grading means applied to the ends of the ground layer. For example, film-forming coating compositions containing particulated nonlinear silicon carbide have been found to have advantageous properties as stress-grading coatings. The liquid coating or semiconductive paint composition may be described as an admixture of finely divided nonlinear silicon carbide and certain thermosetting liquid resinous film-forming materials. Coatings having a content of high-resistivity silicon carbide of approximately 25 percent of the volume of the coating have been found to be excellent, but the percent of volume of the coating may vary considerably on both sides of 25 percent and still produce a satisfactory coating. For example, if lower resistivity silicon carbide is used, the percent by volume of silicon carbide to the coating may drop as low as 10 to 15 percent.

Liquid resinous film-forming varnish compositions which may be employed in admixture with particulated nonlinear silicon carbide to produce suitable coatings which may be utilized, are epoxy modified urea or melamine-formaldehydes, phenolic-modified alkyds and blends of polyvinylformal and phenol-formaldehyde.

In selecting the stress grading composition, the proper resistivity range must be chosen. If the stress-grading means has too low a resistivity, it will not sufficiently reduce the potential difference between the ends of the coatings and the conductor 12. If the resistivity is too low and the coatings are terminated before reaching the conductor 12, corona discharges may be initiated at the end of the stress-grading coating.

If the stress-grading means has too high a resistivity it will act as an insulator and there will be a high electric field at the end of the ground layer 34, which may initate corona discharges at this point.

The actual composition of the stress-grading coating that is to be utilized for a particular bushing application must be decided by the particular circumstances in each case, dictated by the capacitance between the stress-grading coating and the electrical conductor 12, the voltage to be applied to the electrical conductor 12 and a compromise between too high a resistivity which would produce corona due to too high a voltage gradient along the surface of the stress-grading means and at the junction of the ground layer 34 and stress-grading means, and too low a resistivity which would require a length of the stress-grading means to sufficiently reduce the electric field, which is greater than the length available.

Electrical bushing 10 includes a second or outer body member 60, formed of solid insulating means, with the second body member having first and second ends 62 and 64, respectively, spaced from the ends 14 and 16 of the electrical conductor 12. The second or outer body member 60 completely surrounds the first body member 22, sealing and preventing air from coming into contact with the ground layer 34 and the stress-grading means 40 and 42. As illustrated in FIG. 1, the second body member 60 may be formed in one piece, casting it with a solid resinous insulating system, such as the system used for the first body member 22. The casting mold for forming the second or outer body member 60 may be constructed to provide an integral mounting flange 66, intermediate the ends 62 and 64 of the second body member 60, providing a weather end or portion 68 which extends between the mounting flange 66 and end 14 of the electrical conductor 12, and an encased end or portion 70 which extends mounting flange 66 and the end 16 of conductor 12. The weather end 68 may have a plurality of weather sheds 72 formed therein, to increase the length of the creep path between conductor 12 and the grounded casing of the associated electrical apparatus.

The mounting flange 66 may also be a separate structure which is slipped over the second body member 60 and secured thereto, such as with a suitable adhesive.

Electrical bushing 10 is disposed through an opening 80 in the casing 82 of its associated electrical apparatus, with its flange 66 disposed against the casing about the opening. The opening 80 is sealed by suitable gasket means disposed between the mounting flange and casing, such as gasket member 84, which may be contained in an annular groove formed in the face of the flange 66, if desired. Fastening means, such as nut and bolt combinations 86 may be used to securely fasten the bushing 10 to the metallic casing 82.

The ground layer 34 is connected to the casing 82, during the normal use of the electrical bushing, and the casing 82 is grounded as shown in 88. The grounding of the ground layer 34 may be accomplished by connecting the ground layer 34 via a suitable electrical lead to a metallic sleeve or washer member disposed such that one of the mounting bolts will be telescoped therethrough and make electrical contact therewith, when bolts are used to mount the electrical bushing to the casing 82.

FIG. 2 illustrates a bushing 10' constructed in a manner similar to the bushing 10 shown in FIG. 1, except with a different arrangement for the second body member and a different arrangement for the stress-grading means. Like reference numerals in FIGS. 1 and 2 indicate like components, and will not be described again, while like reference numerals except for a prime mark in FIG. 2 indicate components for like functions, but modified structurally.

More specifically, instead of extending the stress-grading coatings 40 and 42 from the ends of the electrically conductive ground layer 34 to the axial conductor 12 of the bushing 10, stress-grading coatings 40 and 42 are selected such that the voltage difference between the ends of the stress-grading coatings and the conductor 12 reach a suitably low electric field strength before reaching conductor 12.

Further, instead of the outer or second body member 60 being formed in one piece, it has a second or outer body member 60' which has an encased end 70' formed of a cast solid resinous insulation system, and a weather end 68' which is formed of a porcelain housing or shell. Suitable insulating means 90 is disposed between the first body member 22 and porcelain shell, to exclude air therefrom, such as an elastomeric material, with an excellent material being disclosed in copending application Ser. No. 863,827, filed Oct. 6, 1969, now U.S. Pat. No. 3,585,278, which is assigned to the same assignee as the present application.

The porcelain shell 68' may be sealed between its lower end and mounting flange 66 by a gasket member 92, and at its upper end by a gasket member 94, which is disposed between its upper end and a terminal 96 secured to end 14 of the electrical conductor 12.

In summary, there has been disclosed a new and improved high-voltage electrical bushing assembly which obtains axial and radial stress grading without a plurality of concentrically disposed, radially spaced capacitor plates, thus facilitating the manufacture of the bushing. The required stress grading is obtained by utilizing stress grading materials connected to the end of the bushing ground layer, with the stress-grading material and ground layer being sandwiched between inner and outer layers of solid insulating means. Thus, the bushing may be conveniently manufactured by forming the first layer of solid insulation and disposing the ground layer and connected stress-grading extension thereof on the outer surface of the first body member, with the ground layer and stress-grading extensions preferably being in the form of coatings. The outer layer may then be applied to cover and seal the ground layer and stress-grading extensions, preventing air from coming into contact therewith.

I claim as my invention:

1. An electrical bushing adapted to mounting through an opening in the casing of electrical apparatus, comprising:
    an axially extending electrical conductor having first and second ends,
    first solid insulating means disposed about said electrical conductor, having a smooth outer surface, and first and second ends spaced from the first and second ends, respectively, of said electrical conductor,
    an electrically conductive ground layer disposed on the outer surface of said first solid insulating means, providing a substantially cylindrical conductive surface having first and second ends spaced from the first and second ends, respectively, of said first solid insulating means,
    stress-grading means having a voltage-dependent resistivity disposed on the outer surface of said first solid insulating means, between the first and second ends of said ground layer and the ends of said first solid insulating means,
    second solid insulating means having first and second ends, disposed to completely surround said first solid insulating means, and
    mounting means disposed intermediate the ends of said second solid insulating means, dividing the electrical bushing into weather and encased portions.

2. The electrical bushing of claim 1 wherein the stress-grading means contact and extend from the first and second ends of the ground layer to the first and second ends of the electrical conductor, respectively.

3. The electrical bushing of claim 2 wherein the stress-grading means is uniformly disposed on the first solid insulating means, completely covering the outer surface of the first solid insulating means between the ends of the ground layer and the first and second ends of the first solid insulating means.

4. The electrical bushing of claim 2 wherein the stress-grading means extends from the ends of the ground layer to the electrical conductor, with a predetermined axially discontinuous pattern.

5. The electrical bushing of claim 4 wherein the axially discontinuous pattern of the stress-grading means is a spiral.

6. The electrical bushing of claim 4 wherein the width of the axially discontinuous pattern of the stress-grading means changes as the pattern progresses from the ends of the ground layer to the electrical conductor.

7. The electrical bushing of claim 1 wherein the first and second solid insulating means are cast resinous insulation systems.

8. The electrical bushing of claim 1 wherein the first solid insulating means is a cast resinous insulation system, and the second solid insulating means includes a porcelain weather housing on the weather portion of the bushing.

9. The electrical bushing of claim 8 wherein the second solid insulating means includes a cast resinous insulation system on the encased portion of the bushing.

10. The electrical bushing of claim 1 wherein the stress-grading means includes a plurality of serially connected materials, each having a different voltage-dependent resistivity.

11. The electrical bushing of claim 1 wherein the first solid-insulating means has a substantially cylindrical intermediate portion and first and second tapered portions which join opposite ends of the cylindrical intermediate portion, and wherein the ground layer is disposed on the cylindrical intermediate portion of the first solid insulating means and the stress-grading means is disposed on the first and second tapered portions thereof.

* * * * *